United States Patent
Gottlob et al.

(10) Patent No.: US 10,325,000 B2
(45) Date of Patent: Jun. 18, 2019

(54) SYSTEM FOR AUTOMATICALLY GENERATING WRAPPER FOR ENTIRE WEBSITES

(71) Applicant: ISIS INNOVATION LTD, Oxford (GB)

(72) Inventors: Georg Gottlob, Oxford (GB); Tim Furche, Oxford (GB); Giovanni Grasso, Oxford (GB); Christian Schallhart, Oxford (GB); Giorgio Orsi, Oxford (GB)

(*) Notice: Subject to any disclaimer, the term of this patent is extended or adjusted under 35 U.S.C. 154(b) by 317 days.

(21) Appl. No.: 14/871,027

(22) Filed: Sep. 30, 2015

(65) Prior Publication Data

US 2016/0092458 A1   Mar. 31, 2016
US 2016/0321280 A2   Nov. 3, 2016

Related U.S. Application Data

(60) Provisional application No. 62/057,395, filed on Sep. 30, 2014.

(51) Int. Cl.

| | |
|---|---|
| G06F 17/00 | (2019.01) |
| G06F 16/958 | (2019.01) |
| G06F 17/24 | (2006.01) |
| G06F 16/28 | (2019.01) |
| G06F 16/951 | (2019.01) |

(52) U.S. Cl.
CPC .......... G06F 16/958 (2019.01); G06F 16/284 (2019.01); G06F 16/951 (2019.01); G06F 17/241 (2013.01); G06F 17/243 (2013.01)

(58) Field of Classification Search
CPC ............. G06F 17/241; G06F 17/30896; G06F 17/3089

USPC .................................................. 715/230, 255
See application file for complete search history.

(56) References Cited

U.S. PATENT DOCUMENTS

| | | | | |
|---|---|---|---|---|
| 6,549,220 B1* | 4/2003 | Hsu | ....................... | G06F 3/0481 707/E17.111 |
| 6,851,089 B1* | 2/2005 | Erickson | ............... | G06F 16/951 715/255 |
| 8,037,048 B2* | 10/2011 | Panarese | ........... | G06F 17/30522 707/706 |
| 8,595,613 B1* | 11/2013 | Mills | ....................... | G06F 3/048 715/234 |

(Continued)

OTHER PUBLICATIONS

Wang et al., Data Extraction and Label Assignment for Web Databases, ACM 2003, pp. 187-196.*

(Continued)

*Primary Examiner* — Cong-Lac Huynh

(57) ABSTRACT

A system for automatically generating a wrapper for an entire website, the wrapper characterizing the structure of the website, the system having a plurality of functional elements, including at least one annotation module to classify components of a page and generate an annotated, a page classification module to identify functional and informational components of an annotated page, and an action module to identify an action to be taken to further navigate the website, wherein at least one of the annotation module, page classification module and action module is operable in response to a plurality of domain-specific rules, where a domain is understood as a conceptual domain such as real estate, used cars, or electronics.

15 Claims, 3 Drawing Sheets

(56) References Cited

U.S. PATENT DOCUMENTS

| | | | |
|---|---|---|---|
| 8,688,545 B1* | 4/2014 | Angilivelil | G06Q 30/06 705/26.8 |
| 9,323,731 B1* | 4/2016 | Younes | G06F 17/30864 |
| 9,423,890 B2* | 8/2016 | Case | G06K 9/00402 |
| 10,115,121 B2* | 10/2018 | Pai | G06F 16/958 |
| 2002/0007369 A1* | 1/2002 | Saravanan | G06F 17/30899 715/205 |
| 2002/0178169 A1* | 11/2002 | Nair | H04L 69/329 |
| 2003/0167209 A1* | 9/2003 | Hsieh | G06F 17/30864 705/35 |
| 2006/0117268 A1* | 6/2006 | Talley | G06F 17/212 715/769 |
| 2007/0033188 A1* | 2/2007 | Levy | G06F 17/30722 |
| 2007/0073758 A1* | 3/2007 | Perry | G06F 17/30864 |
| 2007/0094267 A1* | 4/2007 | Good | G06F 17/30873 |
| 2007/0277109 A1* | 11/2007 | Chen | G06F 8/20 715/733 |
| 2009/0100345 A1* | 4/2009 | Miller | G06F 11/3688 715/738 |
| 2009/0119268 A1* | 5/2009 | Bandaru | G06F 17/2745 705/7.12 |
| 2009/0249251 A1* | 10/2009 | Eischeid | G06F 3/0481 715/810 |
| 2010/0162097 A1* | 6/2010 | Dalvi et al. | G06F 11/008 715/234 |
| 2010/0198770 A1* | 8/2010 | Sengamedu | G06N 99/005 706/52 |
| 2010/0199165 A1* | 8/2010 | Sengamedu | G06F 16/9535 715/230 |
| 2011/0022552 A1* | 1/2011 | Zimmerman | G06N 99/005 706/12 |
| 2011/0153796 A1* | 6/2011 | Branson | G06F 16/9566 709/223 |
| 2014/0172506 A1* | 6/2014 | Parsell | G06Q 30/0204 705/7.33 |
| 2014/0208202 A1* | 7/2014 | Ellis | G06F 17/212 715/238 |
| 2015/0100877 A1* | 4/2015 | Long | G06F 17/30719 715/234 |

OTHER PUBLICATIONS

Embley et al., Conceptual-model-based Data Extraction from Multiple-Record Web Pages, Elsevier 1999, pp. 227-251.*

Laender et al., A Brief Survey of Web Data Extraction Tools, ACM 2002, pp. 84-93.*

Zhai et al., Web Data Extraction based on Partial Tree Alignment, ACM 2005, pp. 76-85.*

Zheng et al., Joint Optimization of Wrapper Generation and Template Detection, ACM 2007, pp. 894-902.*

Zheng et al., Data Extraction from Web Pages based on Structural-Semantic Entropy, ACM 2012, pp. 93-102. (Year: 2012).*

Varlamis et al., an Automatic Wrapper Generation Process for Large Scale Crawling of News Websites, ACM 2014, pp. 1-6. (Year: 2014).*

* cited by examiner

SYSTEM FOR AUTOMATICALLY GENERATING WRAPPER FOR ENTIRE WEBSITES

This application claims the benefit and priority of U.S. Provisional Application 62/057,395 filed on Sep. 30, 2014, the contents of which are hereby incorporated by reference.

The present application relates to a system for automatically generating a wrapper for an entire website, where the wrapper characterises the structure of the website.

BACKGROUND TO THE INVENTION

The identification and retrieval of data from websites is a difficult and pressing issue. While techniques have been developed for 'crawling' the web to classify and index websites, and make the information available for searching and retrieval, extraction of complete data from a site is problematical. It is known for websites to offer APIs to facilitate data extraction, but this is far from universal. Automatic complete extraction of data from a site without a suitable API is problematic as sites are not structured consistently, and page elements such as forms, side bars, and navigation menus can be difficult to correctly identify or interact with. Supervised systems are known, in which a user navigates to a site and identifies relevant data, which the system then uses to direct data extraction, but these are time-consuming and not scalable. Automatic full-site extraction has so far only been successfully used in setting with limited structures, such as title and body extraction from news articles or search engine results. For extracting highly structured data, these approaches are unsuitable.

SUMMARY OF THE INVENTION

According to the present invention there is provided a system for automatically generating a wrapper for a website, the wrapper characterising the structure of the website, the system having a plurality of functional elements, including at least one annotation module to classify components of a page and generate an annotated page, a page classification module to identify functional and informational components of an annotated page, and an action module to identify an action to be taken to further navigate the website, wherein at least one of the annotation module, page classification module and action module is operable in response to a plurality of domain-specific rules, where a domain is understood as a conceptual domain such as real estate, used cars, or electronics.

The annotation module may be responsive to page structure components and text components to identify a domain-specific datatype and associated data value within the page.

The page classification module may comprise at least one analysis module and a first control element, the first control element being responsive to the classified page to select an analysis module.

The at least one analysis module may comprise one or more of a form analysis module, and a results page analysis module.

The page classification module may include a plurality of analysis modules and the first control element may be able to successively select a plurality of analysis modules.

The first control element may be operable to pass control to the action module.

The action module may be operable to select a navigation step and cause a further page of the website to be loaded.

The action module may be operable to select an action comprising one or more of; selecting a link, invoking a form completion module, performing a crawler action or returning to a previous page.

The action which may be selected by the action module may be dependent on the result of the operation of the page classification module.

A plurality of the modules may comprise relational transducers, wherein each relational transducer embodies a set of domain-specific rules defining a relationship between input data and output data.

The plurality of relational transducers may be disposed in a network, such that the execution order of the network of relational transducers varies depending on the page to be classified.

The system may further comprise a control transducer, the control transducer being operable to determine control flow within the network.

The system may further comprise a visual block analysis module to identify graphical elements of the page.

The system may comprise a data extraction system operable to receive the wrapper and navigate the website in accordance with the wrapper to extract data from the website.

BRIEF DESCRIPTION OF THE DRAWINGS

An embodiment of the invention is described by way of example only with reference to the accompanying drawings, wherein.

DETAILED DESCRIPTION OF THE PREFERRED EMBODIMENTS

Figure 1:
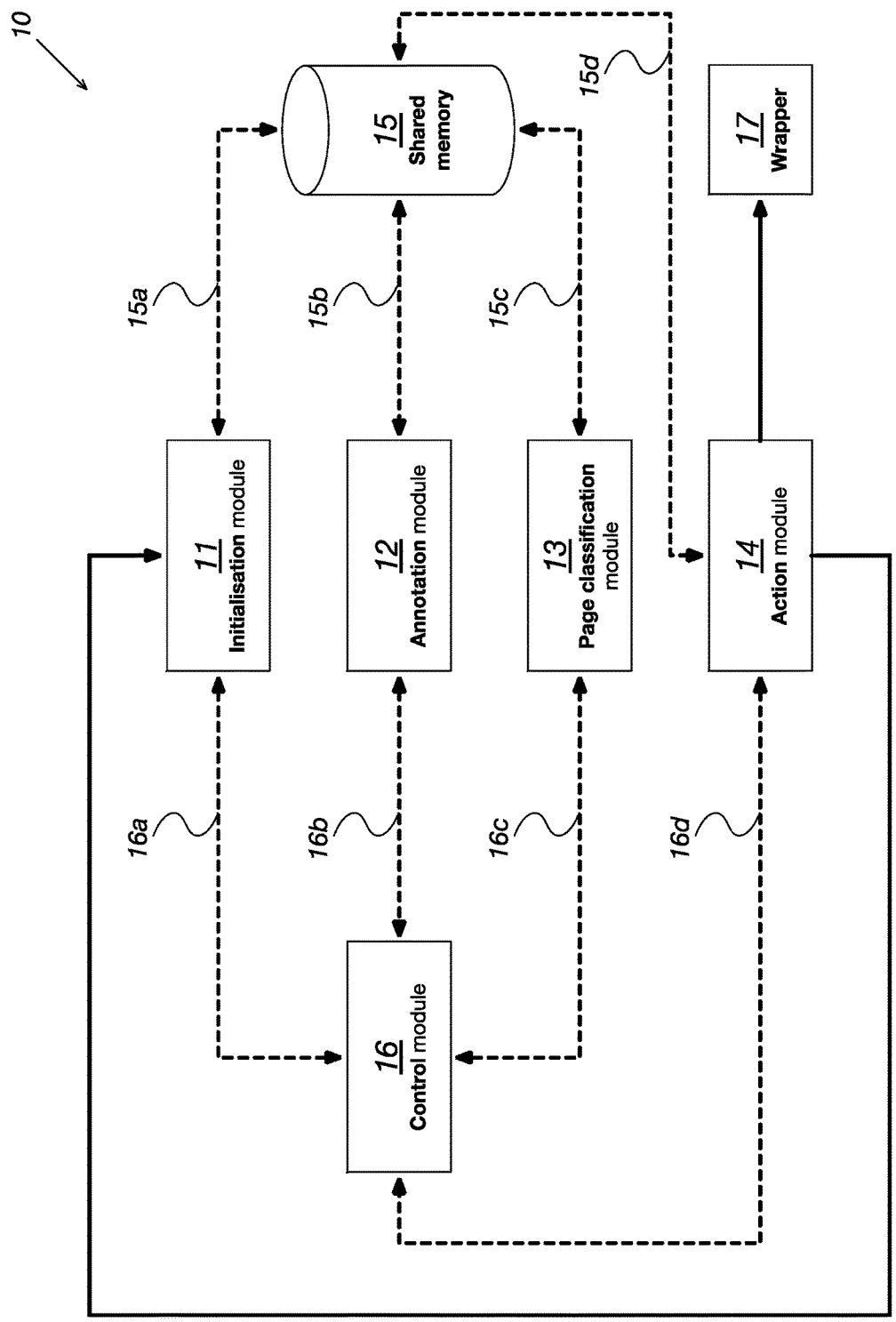
FIG. 1 is an outline illustration of a system embodying the present invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

In the present example, a system embodying the invention will be described with reference to data extraction from sites in a particular knowledge domain, estate agent (real estate)

data. However, the invention is applicable to extracting structured information relating to any other domain.

Throughout this description, we will refer to relational transducers. A relational transducer in this context refers to any computational element, however implemented, which is defined by particular input and output relations. Relational transducers can be self-contained, in that they interact through a shared memory and have no knowledge of each other. Because transducers are self-contained and are directed to a specific set of relations between inputs and outputs, the individual relational transducers can be relatively simple. Advantageously, in the present example the relational transducers are generally written as Datalog programs. Relational transducers, arranged into a transducer network, form the basic components of the system described herein. The transducer network provides integration and communication between the transducers in a way that represents an ideal trade-off among the system's primary integration goals:

(1) Isolation: Transducers communicate through a transactional shared memory and have no other knowledge of each other;

(2) Resumable: Transducers can be executed repeatedly, possibly continuing previously suspended computation, e.g., if new input data has become available.

(3) Complexity: Transducers are generally Datalog programs with controlled value invention, retaining Datalog's polynomial data complexity but with significant performance benefits.

(4) Data partitioning: The relations (in the shared memory) are strictly partitioned into fine-granular transducer scopes.

The relational transducers are resumable: They can yield processing and may be called again on the same page, returning new facts. Resumption is monotone, i.e., additional calls to a transducer may produce additional output, but never retract previously derived facts. Resumable transducers are further distinguished into state- and input-driven transducers. State-driven transducers may produce new facts even if called with the same input, but maintain state between calls. These are typically transducers that iterate over some collection, e.g., all links on a page, and maintain the position in the iteration in their state relations. Input-driven transducers may also be called multiple times, but may only produce new data, if additional input is provided. Typically, these transducers are called only once or twice per page. Resumable transducers are exhausted, if further calls yield no new data.

Relational transducers described herein are each one of three general types:

(1) Stateless phenomenological transducers encoding phenomenological patterns, such as record and attribute identification. These patterns are domain independent, but query the possibly domain-dependent phenomenological knowledge. These transducers are typically input-driven resumable.

(2) Stateful guarded finite state transducers (gFSTs) encode finite state transducers where transitions are guarded by first-order formulas. All exploration decisions are delegated to such transducers, which are typically state-driven resumable. The transducers used for form filling are examples of such transducers.

(3) External programs are required for certain tasks such as interaction with the browser. The corresponding components are designed, such that they can be formalised as relational transducers with an infinite background relation. These transducers are input-driven (e.g., for wrapper induction as discussed in the following example).

A system embodying the present invention, as illustrated in FIG. 1, provides a framework to enable the characterisation of a website, that is generating a wrapper which defines a record and attribute structure for the website. The wrapper effectively amounts to a program which specifies actions to navigate through the pages of a target website and to select elements identified as records. By means of appropriate selection the rules followed by the modules and relational transducers in the framework, the framework can be adapted to search websites in different domains. For example with suitable encoding of domain-specific knowledge, the system can be used to search websites relating to real estate, cars, or any other product, or indeed any other structured website with multiple records as may be desired. Although the invention is particularly described with reference to sites encoded with HTML, it will be apparent that the system can be adapted to read structured sites encoded using any appropriate language or structures.

A system embodying the invention is shown in outline in FIG. 1 at 10. The system 10 comprises an initialisation module 11, an annotation module 12, a page classification module 13, an action module 14, and a shared memory 15. To provide for control of the network, a control module is generally shown at 16. The control module 16 comprises a relational transducer as discussed above. The control transducer 16 is a state-driven resumable transducer for determining control flow and dependencies in the system. If there are multiple transducers which are ready to execute, the control flow is determined by priorities dynamically computed by the control transducer 16 and transducers are executed in order of their priority. The control instructions from the control transducer 16 are illustrated by lines 16a, 16b, 16c, 16d. The shared memory 15 is provided such that each of the modules is able to read from and write to the memory 15 as shown by arrow connections 15a, 15b, 15c, 15d. The shared memory 15 holds a database of the rules used by the transducer network and provides the shared memory through which the transducers interact. When a decision is taken that the site exploration is complete, a wrapper 17 is generated as an output.

Figure 2:
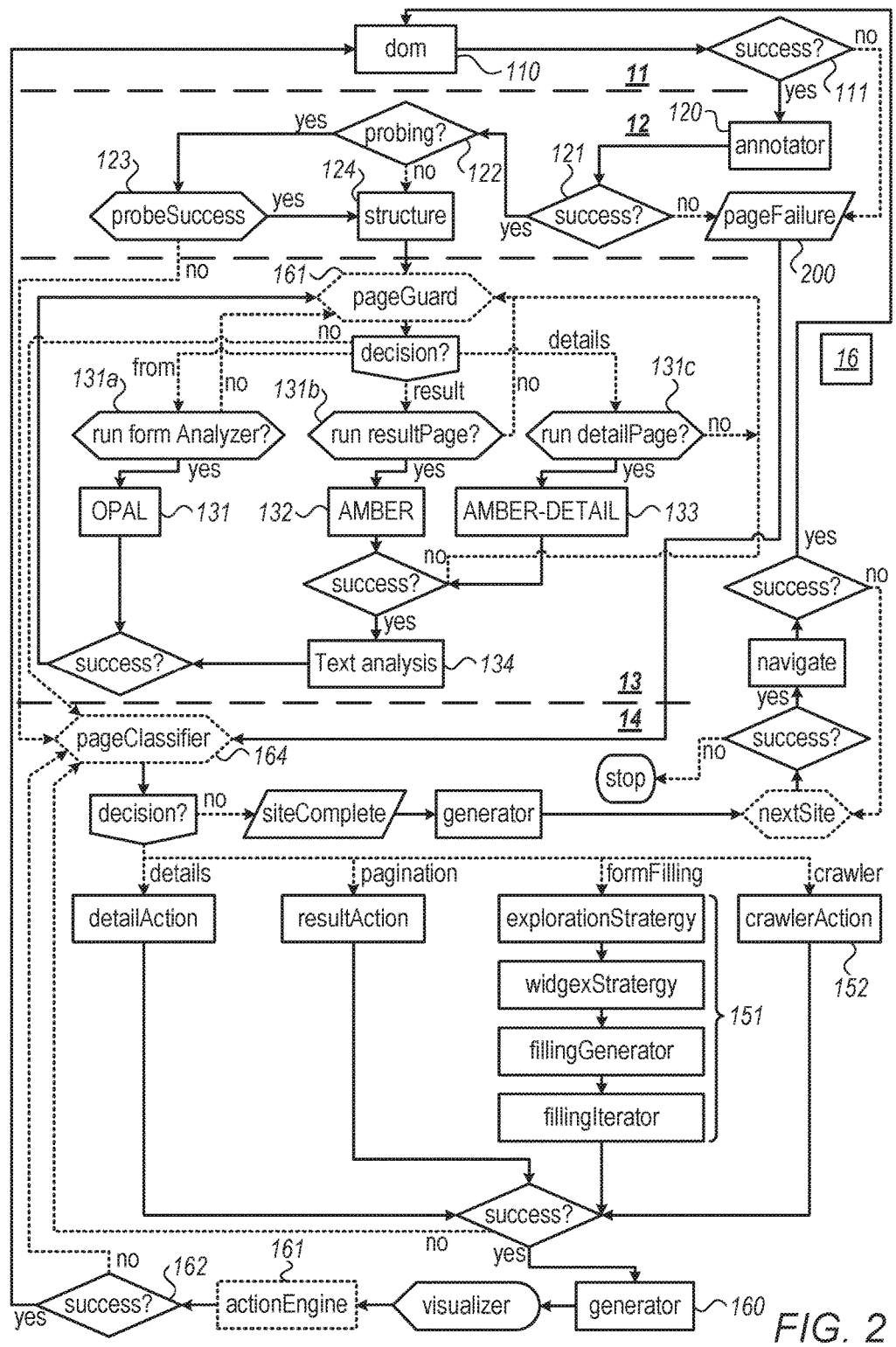
FIG. 2 is a more detailed illustration of the system of FIG. 1.

With reference to FIG. 2, a more detailed illustration of the system of FIG. 1 shown including a number of individual functional elements which provide each of the respective modules, 11, 12, 13, 14 and which may be appropriately implemented using relational transducers. The shared memory 15 and the links thereto are omitted for clarity. The control transducer is generally shown at 16, and individual elements are shown at 16', 16" as examples of where the control transducer 16 serves to control the processing flow of the system 10.

Within the initialisation module 11, element 110 loads the next page of the website to be examined, whether the initial top-level site URL, or a URL for a subsequent page as described below. At element 111, success of this operation is checked and if not, the page failure element is invoked. The loaded HTML document is parsed into a Document Object Model ("DOM") to facilitate subsequent operations. In annotation module 12, the received and parsed page is annotated using an annotator element 120. Advantageously, annotation element 120 uses a plurality of labelled and named entity recognisers ("LNER"s) to identify domain-specific datatypes and values within the page. Using rules derived from the relevant domain knowledge, the LNER serve to identify entities of interest, taking into account the HTML structure and CSS formatting, in addition to the text components of the page.

The success of this step is checked at 121 and element 200 is invoked in the event of failure. As shown at 122 and 123, a probing element may be invoked to assess the page structure if necessary. Visual block identification module 124 identifies graphical and visual elements of the page, such as frames and images.

On completion of the annotation and identification of the various components of the page, the page then is passed to page classification module 13. In the end of this example, a plurality of modules 131, 132, 133 are shown which may be invoked by first control element 16' of the control transducer 16, to identify or interact with functional components of the page (such as forms) or information components of the page (such as the results records of interest).

Each of the analysis modules 131, 132, 133 has an associated guard 131a, 131b, 131c which may implement guard rules for the respective analysis module, to indicate whether the respective module is ready or appropriate for execution. In this example, module 131, referred to as OPAL, is selected when a form has been identified on the page, and analyses the form to identify acceptable inputs and resultant behaviour. If result pages identified, one of modules 132, 133 is run to identify regularities in the structure of a page, typically resulting from data-publishing templates. In this example module 132, referred to as AMBER is realised as a phenomenological transducer that encodes domain-independent rules for detecting patterns on websites. These patterns are combined with template discovery, that is the detection of regularities in the structure of a page. AMBER's transducer is input-driven resumable: it is called once per page in a sequence of result pages (typically connected by pagination links), each time refining the model of the template underlying the result pages. In addition, AMBER uses the concept of a pivot attribute. A pivot attribute, such as PRICE, is a mandatory attributes of an easy to detect type. The system locates these pivot attributes to discard regular structures with irrelevant data or irregular noise in otherwise regular structures, such as advertisements interspersed among records. This increases the accuracy of record and attribute identification compared to existing template discovery approaches. In most product domains, PRICE or product identifier are ideal pivot attributes. In domains with no regular attributes, presentational attributes such as images or details page links may be chosen as pivot attributes. Textual analysis of the results from analysis modules 132, 133 is then performed by text analysis module 134.

Figure 3:
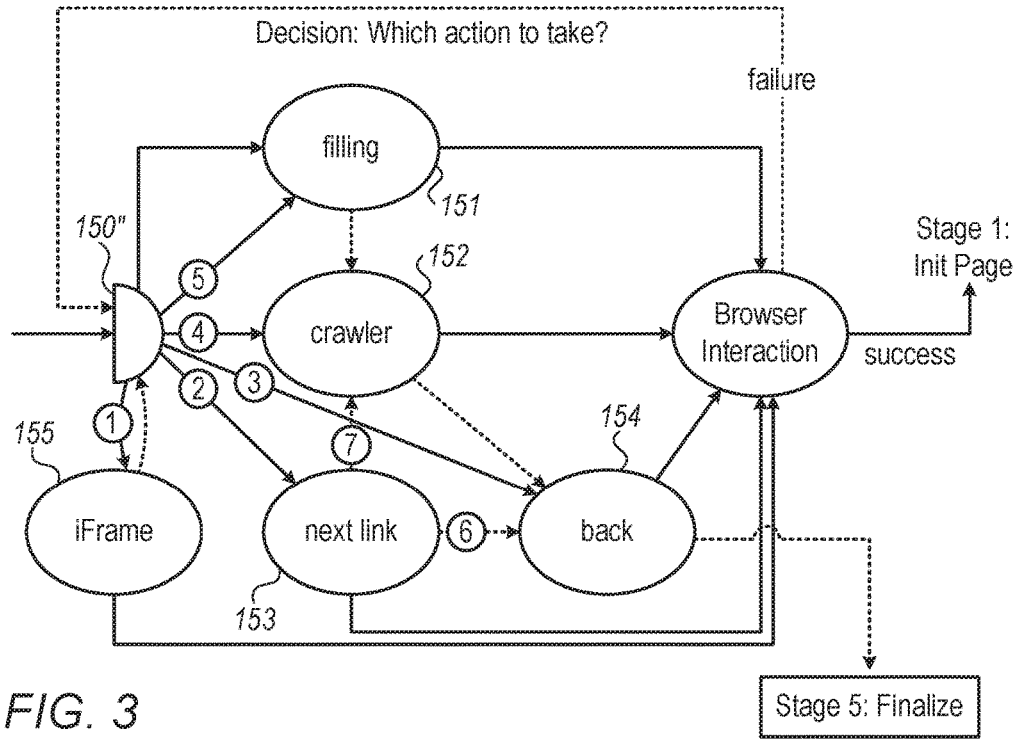
FIG. 3 is a diagram illustrating operation of a part of the system of FIG. 2.

In module 14 as discussed in more detail below, actions for further navigation of the website are selected under the control of second control element 16". The action selected may include filling an identified form as shown at 151, or performing a crawler action as shown in 152. FIG. 3 shows an alternative view of the operation of module 14, including the options of navigating to a further linked page, returning to a previous page, and identifying an iframe and extracting the contents. In the example of FIG. 3 there are five possible action generators 151. 152. 153, 154, 155. Each of these has a different guard, querying the outcome of the analysis and the previous exploration. For example, the next link action generator requires the presence of a list of pagination links, as well as set of records (indicating that this is a listings page). Typically only two or three of these have their guards and dependencies satisfied at this stage. Priorities are used to determine which to run: For example, the crawler 152 is always last and iFrames 155 have priority if they are covering a substantial portion of the page. In many cases, if one of the action generators fails (e.g., if it has already attempted to click on all "next links") some of the other action generators are called next (indicated by the red dashed arrows). For example, if the next link action generator fails, the system either back-tracks to the previous page (arrow 6), if it arrived on the current page through a form; otherwise, it continues crawling relevant links (arrow 7). Back-tracking is essential to the exploration of sites, as their exploration often requires multiple alternative paths. When choosing a path for example by filling a form, the system cannot know yet whether that path will indeed lead to relevant data. Back-tracking is dynamic and based on the transducer dependencies and guards: To back-track, the system goes back over the sequence of executed transducers until it reaches a point where either a transducer is resumable and not yet exhausted, or a prioritised choice of transducers exists with some transducers not yet executed. The control transducer also allows the specification of explicit back-tracking logic that overwrites the default case and is used, for example, for back actions in the browser. In a further example, form filling is an example of a network of state driven resumable transducers that encode guarded finite state transducers and are called repeatedly to generate queries for a given form. The form is analysed by a phenomenological transducer. The form filling is domain aware, as it uses domain knowledge to generate fillings and to react to feedback from filling (e.g., error messages). Each time the control transducer is executed the network's logical clock is advanced by one step.

Figure 4:
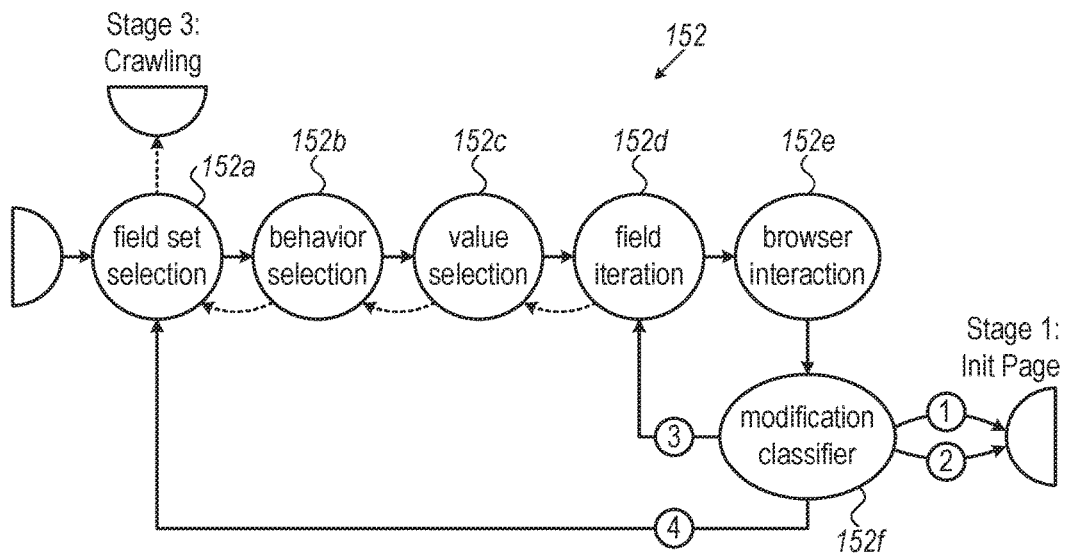
FIG. 4 is a diagram illustrating operation of a further part of the system of FIG. 2.

With reference to FIG. 4, the crawler action element 152 is shown broken down into a number of relational transducers 152a to 152f forming a sub-network of relational transducers.). This process is split into six transducers, including the browser interaction transducer 152e that executes actions and the modification classifier 152f that analyses how the browser's content has changed due to an action. It returns classifications, such as "new page", "major page change", "new form fields", "new window", or "alert". The other four transducers are guarded finite state transducer responsible for selecting fields to be filled (152a); selecting the assumed "behavior" for each field, e.g., that a text field is to be treated as an autocomplete (152b); selecting the specific value for each field (152c); and iterating over all fields, feeding the browser interaction transducer with the filling for each field one by one (152d). These four transducers are all resumable and chained: If there are no more fields to be filled in the current iteration, the filling iteration yields control back to the value selection. The value selection may return the same sequence of fields with different values or, if there are no additional value combinations to try, may fail and yield control to the behaviour selection. Depending on the classification of the modification, execution continues either with the field iteration (typically if there is no change, arrow 1), with the field set selection (if the state of form fields changes, arrow 2), or with the end of the filling phase, for example if a new page is reached (arrow 3).

In the event that the operation is successful, generator 160 stores the relevant information to be included in the wrapper. If the identified action is successfully performed at step 161 and is checked at step 162 the process repeats. The wrapper accumulates information about all identified result pages and the navigation paths leading to them and integrates that information into a coherent wrapper program. It is input driven resumable, called once per page, but accumulating the wrapper information over all the calls for one site.

Within a result page sequence, it combines the collected information into a coherent wrapper for the underlying template of these pages, that is likely applicable also to any other page in the sequence.

Accordingly, the system comprises a plurality of relational transducers which form a synchronised transducer network. The network is referred to as being synchronised as its control flow is determined by a central controller, itself a relational transducer. Intuitively, a transducer network is a set of transducers with a transactional shared memory which serves as input and output for the transducers. The execution is controlled by the control transducer and a specific area in the memory is reserved for communication between controller and transducers. The network is self-adaptive, as the control flow is dynamically determined from transducer dependencies and their guard rules. Rather than relying on one or a few statically defined control flows for exploring a page or site, this allows the network to form different control flows for the exploration of each individual site. Dependency and guard rules, registered by the individual transducers with the control transducer, thus determine for each transducer separately if it can be executed at a given point. This determination is typically based on the already explored portion of the site or page. For example, a form analysis transducer has a dependency on the transducer that produces annotations for Document Object Model ("DOM") elements and a guard rule that prevents it from running if there are no form elements on the page. It has the same priority as, e.g., the record identification transducer, which has similar dependencies, but is guarded by requiring the presence of pivot attribute annotations. If both guards are satisfied, the transducers may be executed in parallel. Transducers that yield an interaction with the browser cannot be executed in parallel, but must be sequentialised, as parallel access may break server state or Javascript execution. Therefore, for the selection and execution of actions, explicit priorities are used to sequentialise the actions and to prioritise actions with the highest estimated probability to lead to relevant data.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

Meanings of technical and scientific terms used herein are to be commonly understood as by one of ordinary skill in the art to which the invention belongs, unless otherwise defined.

The invention claimed is:

1. A system for automatically generating a wrapper for a website, the wrapper characterising the structure of the website,
   the system having a shared memory, a control mechanism and a plurality of functional elements, including
   at least one annotator to classify components of a page and generate an annotated page,
   a page classifier to identify functional and informational components of an annotated page, and
   an action selector to identify an action to be taken to further navigate the website, wherein:
   (a) at least one of the annotator, page classifier, and action selector is operable in response to a plurality of domain-specific rules formulated in a rule-language belonging to a plurality of languages including Datalog-based languages;
   (b) the shared memory stores data belonging to one or more categories from a plurality of data categories including at least (i) a representation of parsed web-pages belonging to the website (ii) data representing knowledge about a specific application domain and about how items in this application domain are usually represented on the web, and (iii) annotations of relevant components of said parsed web-pages, said annotations being successively generated during the wrapper generating process and representing knowledge about said components including a classification of a subset of said components;
   (c) each functional element reads data from the shared memory as its input and contributes its output data into said shared memory, whereby the functional elements communicate via the shared memory and progressively enrich the shared memory with data representing knowledge about the structure of the website, and about the classification and structure of its pages, and its components;
   (d) the control mechanism determines the order of execution of the functional elements;
   (e) the functional elements which are operable in response to rules apply said rules to infer new data from data already stored in the shared memory and add such new data to the shared memory;
   (f) each annotator classifies components of one or more web pages of the website and stores each classification of a component into the shared memory as an annotation to the representation of said component;
   (g) the page classifier classifies at least one page from said website based on annotations generated by at least one annotator and possibly by other functional elements;
   (h) the action selector triggers navigation steps and the loadings of linked new pages, and performs simulated navigational user-actions; and
   (i) wherein the system is configured to induce, at the end of the execution of the functional elements, from the annotations and from other data generated by the functional elements and stored into the shared memory, a wrapper for the entire website, said wrapper being a program which, when executed by a wrapper execution engine, is able to (A) navigate to relevant pages of the entire website and (B) select and extract data from said relevant pages without the need of comparing any of said relevant pages or their object models to any annotated object model.

2. A system according to claim 1 wherein the annotator is responsive to page structure components and text components to identify a domain-specific datatype and associated data value within the page.

3. A system according to claim 1 wherein the page classifier comprises at least one analyzer and a first control element, the first control element being responsive to the classified page to select an analyzer.

4. A system according to claim 3 wherein the at least one analyzer may comprise one or more of a form analyzer, and a results page analyzer.

5. A system according to claim 3 wherein the page classifier includes a plurality of analyzers and the first control element is able to successively select a plurality of analyzers.

6. A system according to claim 3 wherein the first control element is operable to pass control to the action selector.

7. A system according to claim 1 wherein the action selector is operable to select a navigation step and cause a further page of the website to be loaded.

8. A system according to claim 7 where the action selector is operable to select an action comprising one or more of: selecting a link, invoking a form completer, performing a crawler action or returning to a previous page.

9. A system according to claim 8 wherein the action which may be selected by the action selector is dependent on the result of the operation of the page classifier.

10. A system according to claim 1 wherein a plurality of the functional elements comprise relational transducers, wherein each relational transducer embodies a set of domain-specific rules defining a relationship between input data and output data.

11. A system according to claim 10 wherein the plurality of relational transducers are disposed in a network, such that the execution order of the network of relational transducers varies depending on the page to be classified.

12. A system according to claim 11 further comprising a control transducer, the control transducer being operable to determine control flow within the network.

13. A system according to claim 1 comprising a visual block analyzer to identify graphical elements of the page.

14. A system according to claim 1 comprising a data extraction system operable to receive the wrapper and navigate the web site in accordance with the wrapper to extract data from the website.

15. A system according to claim 1, wherein the control mechanism determines the order of execution of the functional elements by operating in one of the following modes:
  a) centralized control, whereby a control program with access to the shared memory determines the order of invocation of the functional elements,
  b) decentralized control, whereby some initial functional element is activated first and each functional element determines via control elements which functional element is activated next, and
  c) a combination of centralized and decentralized control.

* * * * *